(12) United States Patent
Stenzel et al.

(10) Patent No.: US 9,034,984 B2
(45) Date of Patent: *May 19, 2015

(54) ION-CONDUCTIVE THERMOPLASTIC COMPOSITION, ELECTROCHROMIC COMPOSITE SYSTEM AND PROCESS FOR PRODUCING ION-CONDUCTIVE FOIL

(75) Inventors: Holger Stenzel, Hennef (DE);
Alexander Kraft, Eichwalde (DE);
Karl-Heinz Heckner, Berlin (DE);
Matthias Rottmann, Blankenfelde (DE); Bernd Papenfuhs, Obertshausen (DE); Martin Steuer, Liederbach (DE)

(73) Assignee: Dritte Patentportfolio Beteiligungsgesellschaft mbH & Co. KG, Schönefeld/Waltersdorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/472,820

(22) Filed: May 16, 2012

(65) Prior Publication Data

US 2012/0224249 A1    Sep. 6, 2012

Related U.S. Application Data

(63) Continuation of application No. 10/560,902, filed as application No. PCT/EP2004/051141 on Apr. 5, 2006, now Pat. No. 8,188,182.

(30) Foreign Application Priority Data

Jun. 17, 2003 (DE) ................. 103 275 177

(51) Int. Cl.
| | |
|---|---|
| *C08G 18/08* | (2006.01) |
| *C08G 63/48* | (2006.01) |
| *C08G 63/91* | (2006.01) |
| *C08K 3/00* | (2006.01) |
| *C08F 8/00* | (2006.01) |
| *H01B 1/12* | (2006.01) |
| *B32B 17/10* | (2006.01) |
| *C09K 9/02* | (2006.01) |

(52) U.S. Cl.
CPC .......... *H01B 1/122* (2013.01); *B32B 17/10577* (2013.01); *B32B 17/10761* (2013.01); *C09K 9/02* (2013.01)

(58) Field of Classification Search
CPC ............. H01B 1/122; B32B 17/10577; B32B 17/10761
USPC ......................................................... 525/61
See application file for complete search history.

(56) References Cited

U.S. PATENT DOCUMENTS

| | | | |
|---|---|---|---|
| 3,468,749 A | 9/1969 | Mattimoe et al. | |
| 4,128,694 A | 12/1978 | Fabel et al. | |
| 4,210,564 A | 7/1980 | Pouchol | |
| 4,397,969 A | 8/1983 | Pouchol | |
| 4,499,236 A | 2/1985 | Hermann et al. | |
| 4,968,745 A | 11/1990 | Misra et al. | |
| 4,999,253 A | 3/1991 | Misra et al. | |
| 5,030,688 A | 7/1991 | Misra et al. | |
| 5,215,821 A * | 6/1993 | Ho ............................... | 428/432 |
| 5,244,557 A | 9/1993 | Defendini et al. | |
| 5,424,150 A | 6/1995 | Ohnishi et al. | |
| 5,434,207 A | 7/1995 | Fischer | |
| 5,670,574 A | 9/1997 | Hill | |
| 5,838,483 A | 11/1998 | Teowee et al. | |
| 5,939,489 A | 8/1999 | Muller | |
| 6,087,426 A | 7/2000 | Helms et al. | |
| 6,361,709 B1 | 3/2002 | Bauer et al. | |
| 6,555,594 B1 | 4/2003 | Fukushima et al. | |
| 6,992,130 B2 | 1/2006 | Kusudou et al. | |
| 7,312,275 B2 | 12/2007 | Papenfuhs et al. | |
| 7,358,304 B2 | 4/2008 | Papenfuhs et al. | |
| 8,188,182 B2 * | 5/2012 | Stenzel et al. ................ | 524/779 |
| 2005/0079363 A1 | 4/2005 | Hoss et al. | |
| 2005/0239960 A1 | 10/2005 | Papenfuhs et al. | |
| 2006/0052533 A1 | 3/2006 | Papenfuhs et al. | |
| 2006/0205871 A1 | 9/2006 | Papenfuhs et al. | |
| 2007/0231544 A1 | 10/2007 | Stenzel | |
| 2007/0231550 A1 | 10/2007 | Stenzel | |

FOREIGN PATENT DOCUMENTS

| | | |
|---|---|---|
| DE | 2752054 A1 | 6/1978 |
| DE | 10143190 A1 | 3/2003 |
| EP | 185863 A1 * | 7/1986 |
| EP | 0392839 A2 | 10/1990 |
| EP | 0461685 A2 | 12/1991 |
| EP | 0499115 A1 | 8/1992 |
| EP | 1056097 A2 | 11/2000 |
| EP | 0657897 B1 | 6/2001 |
| EP | 1227362 A1 | 7/2002 |
| JP | 63-065390 A | 3/1988 |
| JP | 06-122713 A | 5/1994 |
| JP | 06-192326 A | 7/1994 |
| JP | 09-118718 A | 5/1997 |
| JP | 2000-128937 A | 5/2000 |

(Continued)

OTHER PUBLICATIONS

Machine Translation of EP 185863 A1, 2013.*

(Continued)

*Primary Examiner* — Liam J Heincer

(74) *Attorney, Agent, or Firm* — Panitch Schwarze Belisario & Nadel LLP

(57) ABSTRACT

An ion-conductive thermoplastic compositions contains a partially acetalated polyvinyl alcohol, at least one support electrolyte and at least one plasticizer. The partially acetalated polyvinyl alcohol contains two different acetal units. Electrochromic laminated glass systems produced using the ion-conductive compositions and a method for producing the systems are also provided.

12 Claims, 1 Drawing Sheet

(56) References Cited

FOREIGN PATENT DOCUMENTS

| WO | 0240578 | A1 | 5/2002 |
| WO | 02102382 | A1 | 12/2002 |
| WO | 03020776 | A1 | 3/2003 |

OTHER PUBLICATIONS

Int'l Search Report issued Oct. 18, 2004 in Int'l Application No. PCT/EP2004/051141.

* cited by examiner

US 9,034,984 B2

ION-CONDUCTIVE THERMOPLASTIC COMPOSITION, ELECTROCHROMIC COMPOSITE SYSTEM AND PROCESS FOR PRODUCING ION-CONDUCTIVE FOIL

CROSS-REFERENCE TO RELATED APPLICATIONS

This application is a continuation of U.S. patent application Ser. No. 10/560,902, filed Apr. 5, 2006, which is a Section 371 of International Application No. PCT/EP2004/051141, filed Jun. 17, 2004, which was published in the German language on Dec. 23, 2004, under International Publication No. WO 2004/112054 A1, the disclosure of which is incorporated herein by reference.

BACKGROUND OF THE INVENTION

The invention relates to an ion-conductive, thermoplastic composition containing a partially acetalated polyvinyl alcohol, at least one support electrolyte and at least one plasticizer, and to the use, in electrochromic composite glazing, of thin foils produced therefrom.

Composite glazing, whose transparency and/or color can be modified by applying an electric voltage, is referred to in the literature as electrochromic glazing. Typically, electrochromic glazing according to FIG. 1 is built up as follows: glass pane (a)—transparent electrically conductive layer (b)—electrochromic layer (c)—solid electrolyte (d)—redoxable ion storage layer or electrochromic layer (e) complementary to (c)—transparent electrically conductive layer f)—glass pane (g).

Layers c) and e) are separated from each other by a solid electrolyte (d). When applying a voltage to the electrodes b) and f), layers c) and e) are oxidized and/or reduced electrochemically, as a result of which their color and translucence is modified in the case where the layers c) and/or e) are electrochromic layers. The oxidation and reduction of layers c) and e) are accompanied by an exchange of ions with the solid electrolyte d). Consequently, this must have a sufficiently high ion concentration. Moreover, a correspondingly high ion conductivity of the solid electrolyte is required for a rapid switching operation.

A solid electrolyte for electrochromic glazing must also exhibit chemical and electrochemical stability as well as optical transparency, apart from a sufficiently high ion conductivity. Many different materials have already been proposed for the production of solid electrolytes for electrochromic glazing.

In European EP 1 056 097, homopolymers or copolymers of acrylic, methacrylic or styrene compounds in combination with plasticizers and supporting electrolytes and with particles of an inorganic or polymeric filler are disclosed for the production of a solid electrolyte.

U.S. Pat. No. 5,244,557, and EP 392 839, EP 461 685 and EP 499 115 describe solid electrolytes based on polyethylene oxide.

In commercial composite glazing without electrochromic properties, intermediate foils of polyvinyl butyral (PVB), i.e. a partially acetalated polyvinyl alcohol, are frequently used. Polyvinyl butyral foils have the advantage of exhibiting a high transparency and provide the glass laminates made therefrom with a good mechanical strength.

The use of polyvinyl butyral foils in electrochromic composite glazing is consequently also known and disclosed, e.g. in EP 1 227 362 and EP 0 657 897. The ion-conductive polyvinyl butyral foils proposed in these applications are produced from conventional PVB resin, plasticizers and support electrolytes as well as, if necessary, further additives. In order to guarantee a sufficiently high ion conductivity, however, a higher plasticizer content is required in this case than in conventional, non-ion-conductive PVB foils. A higher plasticizer content negatively influences the mechanical properties of the foil. Polyvinyl butyral foils in electrochromic glazing consequently possess either an insufficiently high ion conductivity with a good mechanical stability or—in the case of an increased plasticizer content—an improved ion conductivity with a reduced mechanical stability.

BRIEF SUMMARY OF THE INVENTION

It has been the object of the present invention to modify the mixtures, based on partially acetalated polyvinyl alcohols which are frequently used in composite glazing, in such a way that a satisfactory long-term stability, a good ion conductivity, and a satisfactory switching behavior of electrochromic glazing produced therefrom, with sufficiently high mechanical properties is the result.

Partially acetalated polyvinyl alcohols, in particular polyvinyl butyral in this case, are produced on an industrial scale by saponifying polyvinyl acetate and subsequently acetalating it with an aldehyde (butanal). In this way, ternary polymers are formed which, as a rule, exhibit residual acetate contents of up to 5% by weight, polyvinyl alcohol contents of 15 to 30% by weight and a degree of acetalation of 40 to 80%.

Surprisingly enough, it has been found that mixtures of at least one support electrolyte, at least one plasticizer and one acid-functionalized partially acetalated polyvinyl alcohol exhibit an increased ion conductivity and, in electrochromic glazing produced therefrom, an improved switching behavior and an improved long-term stability.

The object of the invention is consequently achieved by an ion-conductive thermoplastic composition containing a partially acetalated polyvinyl alcohol, at least one support electrolyte and at least one plasticizer, the partially acetalated polyvinyl alcohol being a co-polymer containing the following monomer units:

vinyl acetate;

vinyl alcohol;

acetal I from vinyl alcohol and at least one aldehyde having formula I $$R^1\text{—CHO} \tag{I}$$

where $R^1$ is a branched or unbranched alkyl radical having 1 to 10 carbon atoms;

acetal II from vinyl alcohol and a carbonyl compound having the formula II

$$\tag{II}$$

where $R^2$=H or a branched or unbranched alkyl radical having 1 to 10 carbon atoms, $R^3$=a direct bond, a branched or unbranched alkyl radical having 1 to 10 carbon atoms, or an aryl radical having 6 to 18 carbon atoms; and $Y$=—$CO_2H$, —$SO_3H$, or —$PO_3H_2$.

The compositions according to the invention preferably contain:
- 50 to 90% by weight, in particular 50-70% by weight, of the partially acetalated polyvinyl alcohol described above;
- 10 to 50% by weight, in particular 20 to 40% by weight of at least one plasticizer; and
- 0.1 to 25% by weight, in particular 2-10% by weight, of at least one support electrolyte.

A process for the production of ion-conductive foils is also achieves the object of the invention, wherein a mixture of the partially acetalated polyvinyl alcohols described above having at least one plasticizer and at least one supporting electrolyte, in the above-mentioned proportions and with preferred embodiments, is extruded to form a foil.

Moreover, the object of the invention is achieved by an electrochromic composite system built up of two electrode-coated bodies, at least one of which is transparent and at least one exhibits an electrochromic film, the bodies coated with electrodes being separated by a foil containing the ion-conductive thermoplastic composition according to the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
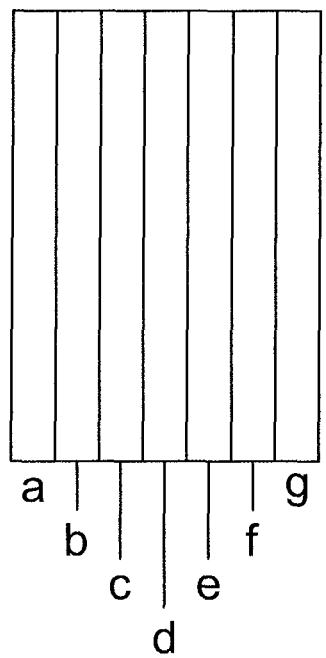
FIG. 1 shows a typical electrochromic glazing built up as follows: glass pane (a), transparent electrically conductive layer (b), electrochromic layer (c), solid electrolyte (d), redoxable ion storage layer or electrochromic layer (e) complementary to (c), transparent electrically conductive layer f), and glass pane (g)

The partially acetalated polyvinyl alcohol used in the present invention contains at least two different acetal units I and II, of which the acetal unit II is preferably obtained from vinyl alcohol and/or vinyl alcohol units of polyvinyl alcohol and an acid-functionalized aldehyde. Glyoxylic acid (here, $R^3$ represents a direct bond between the acid function Y and the carbonyl carbon atom), in particular, or pyruvic acid can be used as the acid-functionalized aldehyde.

The acetals I are preferably produced as an extremely pure substance or isomer mixture, in each case by reacting vinyl alcohol and/or vinyl alcohol units of polyvinyl alcohol having at least one aldehyde from the group of formaldehyde, acetaldehyde, propanal, n-butanal (butylaldehyde), isobutanal, pentanal, hexanal, heptanal, octanal, and/or nonanal. n-Butanal is used particularly preferably, which is also used in the production of commercial polyvinyl butyral.

The numeric ratio of the polymer units of the partially acetalated polyvinyl alcohol from acetal I and acetal II can be adjusted within wide ranges and is preferably 1:1 to 10,000:1, in particular 10:1 to 1000:1, or 100:1 to 1000:1.

The production of the partially acetalated polyvinyl alcohol can take place in a manner analogous to that of commercial polyvinyl butyral, a co-acetalation of polyvinyl alcohol with at least two different aldehydes or carbonyl compounds taking place to give the acetal groups I and II. Alternatively, an additional acetalation of polyvinyl butyral already produced can take place according to DE 10 143 190.

Moreover, it is possible to use a mixture of several partially acetalated polyvinyl alcohols, e.g. with commercial PVB.

It should be pointed out that the functionalized acetal units II are capable of reacting, with crosslinking, with the vinyl alcohol units still present in the partially acetalated polyvinyl alcohol. The crosslinking reaction is dependent, among other things, on the thermal treatment of the material during foil production and can consequently lead to very different degrees of crosslinking.

Compositions according to the invention preferably contain a partially acetalated polyvinyl alcohol having the repeating units:
- 0.01 to 5% by weight of vinyl acetate;
- 10 to 40% by weight, preferably 15 to 35% by weight, of vinyl alcohol; and
- 40 to 80% by weight, preferably 45 to 75% by weight, of acetals I and II.

Salts having cations such as $Li^+$, $K^+$, $Na^+$, $Cs^+$, $Rb^+$, $NH_4^+$, $Mg^{2+}$, $Sr^{2+}$, $Ca^{2+}$, $La^{3+}$, and/or $Zn^{2+}$ and anions from the group of $PF_6^-$, $SbF_6^-$, $AsF_6^-$, $F^-$, $Cl^-$, $Br^-$, $CF_3SO_3^-$, $ClO_4^-$, $ClO_3^-$, $BF_4^-$, $N(SO_2CF_3)_2^-$, $CF_3CO_2^-$, $B_4O_7^{2-}$, pentaborate, oxalate, bisoxalatoborate $(C_4BO_{8-})$, $AlCl_{4-}$, and/or anions of organic sulphonic acids, can be used as a support electrolyte.

Preferred support electrolytes are $LiClO_4$, $LiPF_6$, $LiSbF_6$, $LiAsF_6$, $Li(CF_3COO)$, $LiBF_4$, $LiCF_3SO_3$, $Li_2C_2O_4$, $LiN(SO_2CF_3)_2$, or lithium bisoxalatoborate $(LiC_4BO_8)$.

Preferably, compounds having the formula III:

$$R^4-(OCH_2CH_2)_n-OR^5 \quad (III)$$

are used as a plasticizer or plasticizer component for the compositions according to the invention, $R^4$, $R^5$ representing identical or different, branched or unbranched, cyclic or acyclic, aliphatic and/or aromatic hydrocarbon radicals having 1 to 15 carbon atoms, or H, and n representing an integer between 1 and 5.

Additionally, all plasticizers can be employed which are usually used with polyvinyl butyral. These include esters of multivalent aliphatic or aromatic acids, multivalent aliphatic or aromatic alcohols or oligoether glycols having 1 to 10, preferably 1 to 4, ether units having one or several unbranched or branched aliphatic or aromatic substituents, e.g., dialkyl adipate, dialkyl sebacate, esters of diglycol, triglycol or tetraglycol having linear or branched aliphatic carboxylic acids.

Particularly suitable are triethylene glycol dimethyl ether or tetraethylene glycol dimethyl ether, in particular in combination with triethylene glycol-di-2-ethyl hexanoate (3G8), triethylene glycol-di-n-heptanoate (3G7), and/or glycol esters of benzoic acid.

The components of the compositions according to the invention can be mixed in commercial kneaders, mixers or extruders. In particular, it is possible to use the extrusion lines employed for processing polyvinyl butyrals to foils. For further processing of the compositions, foil thicknesses analogous to the polyvinyl butyral foils usually used (0.38, 0.76, 1.14 and 1.5 mm) have proved suitable.

In order to obtain a roughened foil, the extrusion process according to the invention can be carried out under melt fracture conditions as described, e.g., in European Patent EP 0 185 863 B1.

Alternatively, embossing of a non-roughened foil with corresponding rollers or belts can take place to give a one-sided or double-sided roughness of 40-120 μm.

Preferably, the surface structure is applied by the extrusion process directly before the discharge of the polymer melt from the extrusion die by the above-mentioned melt fracture process corresponding to EP 0 185 863 B1, the content of which is expressly referred to herewith. Different roughness levels can be produced in a controlled manner by varying the die gap width and with the die lip temperatures directly at the die exit. This process leads to an irregular (stochastic) approximately isotropic roughness (random roughness). This means that the measured value of the roughness, measured over all directions, is approximately the same, but the individual elevations and troughs are arranged in an irregular manner as regards their height and distribution.

Measuring of the surface roughness of the foil, i.e. the roughness value $R_z$, is carried out according to DIN 4768 or DIN EN ISO 4287 and DIN ISO 4288. The measuring devices used for measuring the surface roughness need to satisfy EN ISO 3274. The profile filters used need to correspond to DIN EN ISO 11562.

To produce the composite glass systems according to the invention, two transparent bodies, in particular (a and g in FIG. 1), particularly preferably two glass panes, are coated with conductive transparent layers (b and f in FIG. 1) as electrodes.

Preferably, indium-doped tin oxide (ITO), aluminum-doped zinc oxide, fluorine-doped or antimony-doped tin dioxide (FTO or ATO) is used as a transparent electrode material.

Onto at least one of these electrodes (b in FIG. 1), an electrochromic film (c) is applied which modifies the color and/or transparency in the case of anodic oxidation or cathodic reduction. Metal polycyanometalates, such as iron hexacyanoferrate, transition metal oxides, such as tungsten trioxide, or conductive polymers, such as polyaniline, polythiophene or their derivatives, are used for this purpose.

A redoxable ion storage layer or, preferably, an electrochromic layer (e) complementary to (c) is applied onto the other electrode (f).

Preferably, the electrochromic composite glass systems according to the invention contain, as electrochromic coatings, iron hexacyanoferrate (also referred to as Prussian blue, c in FIG. 1) and tungsten trioxide (e in FIG. 1).

EXAMPLES

The following examples are to illustrate the invention in further detail though not to restrict the area of protection as defined in the claims.

1. Comparative Example

Ion-Conductive PVB Foil and Electrochromic Element Produced Therefrom According to the State of the Art An ion-conductive PVB foil having the composition:
65% by weight of PVB having a polyvinyl butyral content of 77.5% by weight, a PVOH content of 20.5% and a polyvinyl acetate content of 2%; and
35% by weight of the plasticizer tetraethylene glycol dimethyl ether containing lithium trifluoromethane sulphonate as support electrolyte (7.33% by weight) as well as the UV absorber Tinuvin 571 (0.15 mass %)

was extruded on a twin screw extruder having co-rotating screws (manufacturer: Leistritz, type LSM 30.34) equipped with a melting pump and slit die at a temperature of the mixture of 160° C.

Using this foil, an electrochromic element was produced. For this purpose, a K-glass pane (FTO-coated float glass) was coated electrochemically with tungsten trioxide and a second K-glass pane with Prussian blue. These two panes equipped with the above-mentioned electrochromic films were laminated together with the ion-conductive PVB foil described above (previously conditioned at 23° C. and 50% relative atmospheric humidity) according to the state of the art using a standard autoclave process for composite safety glass. The active switchable surface of this element amounted to 7.5 cm×18.5 cm (213.75 cm$^2$). After lamination, contacting and sealing of the electrochromic element with an epoxy resin took place. The ion conductivity of the foil in the finished element was determined from the impedance at 40 kHz. A value of $3.3 \cdot 10^{-6}$ S/cm was obtained.

2. Practical Example

Ion-Conductive PVB Foil According to the Invention

An ion-conduction PVB foil having the composition:
65% by weight of PVB having a PVOH content of 20.2%, a polyvinyl acetate content of 1.8%, a content of acetal of glyoxylic acid of 0.5%, and a polyvinyl butyral content of 77.5%; and
35% by weight of the plasticizer tetraethylene glycol dimethyl ether containing lithium trifluoromethane sulphonate as support electrolyte (7.33% by weight) and the UV absorber Tinuvin 571 (0.15% by weight)

was produced as described in Comparative Example 1.

Using this foil, an electrochromic element was produced as described in Comparative Example 1. The active switchable surface of this element was 9 cm×30 cm (270 cm$^2$). After lamination, contacting and sealing of the electrochromic element, as described in Comparative Example 1, took place. The ion conductivity of the foil in the finished element was determined from the impedance at 40 kHz. A value of $6.9 \cdot 10^{-6}$ S/cm was determined.

The incorporation of the glyoxylic acid group into the polymer chain of the PVB consequently leads to an increase in the ion conductivity by a factor of 2 with an otherwise identical foil composition.

3. Comparison of the Electrical Switching Characteristics of Electrochromic Elements According to Examples 1 and 2

The electrical switching characteristics on 1.4V direct current switching were recorded for electrochromic elements of size 10 cm×30 cm, which had been produced with an ion-conductive foil having a conductivity of $3.3 \cdot 10^{-6}$ S/cm (Comparative Example 1) or $6.9 \cdot 10^{-6}$ S/cm (Practical Example 2). In this case, the pane coated with tungsten trioxide is poled negatively, and the pane coated with Prussian blue is poled positively. On decolorizing, a direct voltage of reverse polarity was applied.

Figure 2:
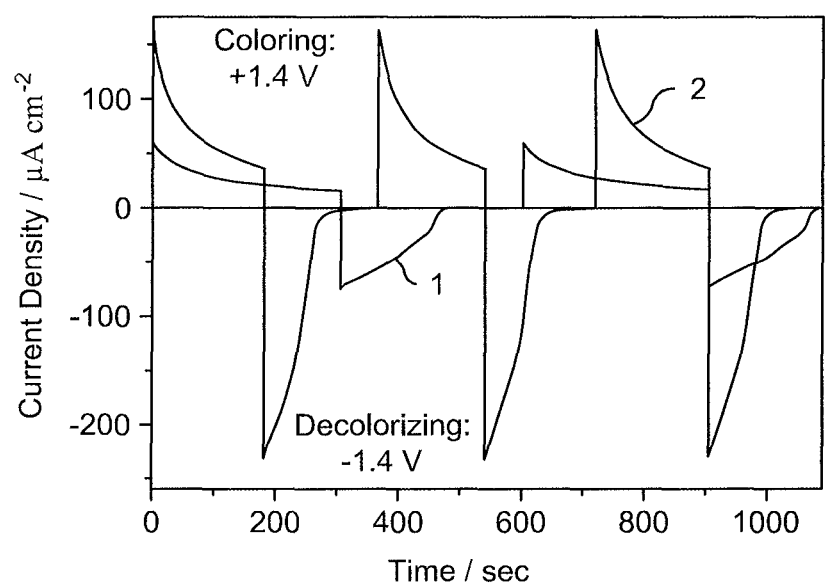
FIG. 2 shows current density-time curves of two elements as a comparison. 1 indicates the current density-time characteristic line of an element according to the state of the art and 2 a polymer electrolyte according to the invention.

FIG. 2 shows current density-time curves of both elements as a comparison. 1 indicates the current density-time characteristic line of an element according to the state of the art and 2 a polymer electrolyte according to the invention. The higher rate of switching of the electrochromic element according to the invention is clearly recognizable by the much higher flowing streams both during coloring and decolorizing. In the case of element 2, an electric charge of 12.48 mC/cm² flows within 3 minutes on coloring. In the case of element 1, only 5.87 mC/cm² flowed after 3 minutes on coloring and only 8 mC/cm² after 5 minutes. Since the depth of coloration is proportional to the charge that has flowed, this practical example shows that the electrochromic element according to the invention switches much more rapidly than example 1 according to the state of the art.

4. Comparison of the Permanent Switching Stability of Electrochromic Elements According to Examples 1 And 2 Subject to Changing Temperatures Permanent switching tests under changing temperatures were carried out using the electrochromic elements of size 10 cm×10 cm, which had been produced with ion-conductive foils according to Comparative Example 1 or Practical Example 2, in order to investigate the long-term stability of the electrochromic elements. The panes were colored with a temperature-dependent direct voltage and decolorized using the same temperature-dependent voltage of reverse polarity (poling as described in Comparison 3).

The temperature-dependence of the voltage U is indicated by the following equation:

$$U = 2.05V - 0.0145 V/K \cdot \Delta T$$

where U=voltage at the corresponding pane temperature T in V, ΔT=temperature difference T+20° C. in K.

The coloring and decolorizing steps follow each other directly, the coloring and decolorizing time being 3 min in each case, such that 10 switching cycles per hour or 240 switching cycles per day were carried out.

The exposure to changing temperatures during switching was effected in a conditioning cabinet. A temperature cycle takes one day in each case. In the case of this temperature cycle, the temperature is maintained for 4 hr at +30°, then raised from +30° to +80° within 4 hr, then maintained at +80° for 4 hr, subsequently reduced from +80° to −25° C. within 4 hr, held at −25° for 4 hr, and finally raised from −25° C. to +30° C. within 4 hr.

Before the beginning of the permanent switching test with exposure to changing temperatures, the switchable charge capacity of the samples was determined with a coloring and/or decolorizing time of 3 min each and a voltage of 1.4 V at a pane temperature of approximately 20° C. This determination was repeated after 4, 11, 18, 32, 60 and 88 temperature cycles (=days). After 88 temperature cycles (corresponding to 21,120 coloring/decolorizing cycles), the switchable charge capacity and consequently the optical contact travel of the specimen according to Comparative Example 1 amounted to only 26% of the initial capacity, had consequently dropped to approximately a quarter of the initial value. The switchable charge capacity of the sample according to Practical Example 2, however, still amounted to 69% of the original value. The electrochromic element according to the invention consequently exhibits a much higher long-term stability than an element according to the state of the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An ion-conductive thermoplastic composition containing a partially acetalated polyvinyl alcohol, at least one support electrolyte and at least one plasticizer, wherein the partially acetalated polyvinyl alcohol is a co-polymer containing the following:
   0.01 to 5% by weight of polyvinyl acetate;
   10 to 40% by weight of vinyl alcohol; and
   40 to 80% by weight of acetals I and II,
   acetal I being obtained from vinyl alcohol and at least one aldehyde having formula I:

$$R^1\text{—CHO} \qquad (I)$$

where $R^1$ is a branched or unbranched alkyl radical having 1 to 10 carbon atoms, and
   acetal II being obtained from vinyl alcohol and a carbonyl compound having formula II:

$$R^2C\text{—}R^3\text{—}Y \qquad (II)$$
   $$\parallel$$
   $$O$$

where $R^2$=H or a branched or unbranched alkyl radical having 1 to 10 carbon atoms, $R^3$=a direct bond, a branched or unbranched alkyl radical having 1 to 10 carbon atoms, or an aryl radical having 6 to 18 carbon atoms, and Y=—$CO_2H$, —$SO_3H$, or —$PO_3H_2$.

2. The ion-conductive thermoplastic composition according to claim 1, wherein a ratio of monomer units in the partially acetalated polyvinyl alcohol of acetal I to acetal II is 1:1 to 10,000:1.

3. The ion-conductive thermoplastic composition according to claim 1 wherein acid-functionalized aldehydes are used as the carbonyl compound of formula II.

4. An electrochromic composite system built up of two bodies coated with electrodes, at least one of which is transparent and at least one exhibits an electrochromic film, which bodies are separated by a foil having a composition according to claim 1.

5. The electrochromic composite system according to claim 4, wherein at least one of the electrochromic films contains a metal polycyanometalate, transition metal oxide, or conductive polymer modifying a color on cathodic reduction.

6. The electrochromic composite system according to claim 4, wherein at least one of the electrochromic films contains a metal polycyanometalate, transition metal oxide or conductive polymer modifying a color on anodic oxidation.

7. The electrochromic composite system according to claim 4, wherein at least one of the electrochromic films contains tungsten trioxide.

8. The electrochromic composite system according to claim 4, wherein at least one of the electrochromic films contains Prussian blue.

9. The electrochromic composite system according to claim 4, wherein one of the electrochromic films contains tungsten trioxide and one of the electrochromic films contains Prussian blue.

10. A process for the production of an ion-conductive foil by extrusion of a mixture of:
    a) 50-90% by weight of a partially acetalated polyvinyl alcohol containing the following:
       0.01 to 5% by weight of polyvinyl acetate;
       10 to 40% by weight of vinyl alcohol;
       40 to 80% by weight of acetals I and II;
       acetal I being obtained from vinyl alcohol and at least one aldehyde having formula I:

$$R^1\text{—CHO} \qquad (I)$$

where $R^1$ is a branched or unbranched alkyl radical having 1 to 10 carbon atoms;
acetal II being obtained from vinyl alcohol and a carbonyl compound having formula II:

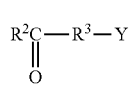
(II)

where $R^2$=H or a branched or unbranched alkyl radical having 1 to 10 carbon atoms, $R^3$ is a direct bond, a branched or unbranched alkyl radical having 1 to 10 carbon atoms, or an aryl radical having 6 to 18 carbon atoms, and Y=—$CO_2H$, —$SO_3H$, —$PO_3H_2$;

b) 10 to 50% by weight of at least one plasticizer; and
c) 0.1 to 25% by weight of at least one support electrolyte.

11. The process according to claim 10, wherein the extrusion is carried out under melt fracture conditions.

12. The process according to claim 10, wherein the foil is embossed on one side or both sides having a roughness $R_z$ of 40-120 μm.

* * * * *